(12) United States Patent
Kira (10) Patent No.: US 9,684,408 B2
(45) Date of Patent: Jun. 20, 2017

(54) TOUCH PANEL (71) Applicant: Sharp Kabushiki Kaisha, Osaka (JP)

(72) Inventor: Takatoshi Kira, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/907,897

(22) PCT Filed: Jul. 29, 2014

(86) PCT No.: PCT/JP2014/069961
§ 371 (c)(1),
(2) Date: Jan. 27, 2016

(87) PCT Pub. No.: WO2015/016225
PCT Pub. Date: Feb. 5, 2015

(65) Prior Publication Data
US 2016/0162103 A1 Jun. 9, 2016

(30) Foreign Application Priority Data
Aug. 1, 2013 (JP) .................................. 2013-160525

(51) Int. Cl.
G06F 3/041 (2006.01)
G06F 3/044 (2006.01)

(52) U.S. Cl.
CPC ............ *G06F 3/0416* (2013.01); *G06F 3/044* (2013.01); *G06F 2203/04111* (2013.01)

(58) Field of Classification Search
CPC .................. G06F 3/0416; G06F 3/044; G06F 2203/04111
See application file for complete search history.

(56) References Cited

U.S. PATENT DOCUMENTS

2011/0157065 A1* 6/2011 Murata ............... G06F 3/03547
345/173
2012/0075237 A1* 3/2012 Ikeda ....................... G06F 3/044
345/174

(Continued)

FOREIGN PATENT DOCUMENTS

JP 2007-304390 A 11/2007
JP 2013-16026 A 1/2013

(Continued)

*Primary Examiner* — Andrew Sasinowski
(74) *Attorney, Agent, or Firm* — Chen Yoshimura LLP (57) ABSTRACT A touch panel having an active area where a touch input is performed, including: a tempered glass substrate having a compressive stress layer formed in a surface thereof; a transparent electrode made of an inorganic oxide film formed within the active area of the touch panel over the tempered glass substrate; a base layer made of an organic film provided between the transparent electrode and the compressive stress layer, the base layer being sandwiched between the transparent electrode and the compressive stress layer such that the transparent electrode and the compressive stress layer are not in contact with each other; and an overcoat layer made of an organic film provided on a side of the transparent electrode that is opposite to the compressive stress layer, the overcoat layer covering the transparent electrode so as to contact the transparent electrode on the base layer.

3 Claims, 5 Drawing Sheets (56) References Cited

U.S. PATENT DOCUMENTS

2013/0082961 A1\* 4/2013 Wang .................. G06F 3/044
                                                    345/173
2013/0169591 A1\* 7/2013 Hung .................. C03C 21/00
                                                    345/174

FOREIGN PATENT DOCUMENTS

| JP | 2013-97739 A  | 5/2013 |
| JP | 2013-143007 A | 7/2013 |

\* cited by examiner

TOUCH PANEL

TECHNICAL FIELD

The present invention relates to a touch panel.

This application claims the benefit of Japanese Patent Application 2013-160525, filed in Japan on Aug. 1, 2013, which is hereby incorporated in its entirety.

BACKGROUND ART

A device in which a touch panel is attached to the surface of a liquid crystal panel is known as a display device with a touch input function (see Patent Document 1). To increase mechanical strength, a device in which a cover glass is disposed on the surface of a touch panel is known. However, to make the device thinner and lighter, a device in which a touch sensor is formed on the surface of a substrate made of a tempered glass (referred to as tempered glass substrate below), and in which the cover glass is eliminated has also been proposed (see Patent Document 2).

RELATED ART DOCUMENTS

Patent Documents

Patent Document 1: Japanese Patent Application Laid-Open Publication No. 2007-304390
Patent Document 2: Japanese Patent Application Laid-Open Publication No. 2013-97739

SUMMARY OF THE INVENTION

Problems to be Solved by the Invention

A tempered glass substrate has a compressive stress layer formed on the surface of a glass substrate by an ion exchange method, an air cooling tempering method, or the like and has a higher mechanical strength than a conventional glass substrate. A touch sensor is made by forming an inorganic transparent electrode that detects the input position and an interlayer insulating film on the surface of the tempered glass substrate (the surface of the compressive stress layer).

However, the research by the inventors of the present invention has shown that by forming a touch sensor on the surface of the tempered glass substrate, the values of a surface impact test or glass surface strength measurement decrease significantly compared to values that a tempered glass substrate normally indicates due to ion exchange or the like. Thus, even with a load that is below the normal impact resistance strength, the tempered glass substrate broke, or the transparent electrode became disconnected, and adequate mechanical strength could not be achieved.

One aspect of the present invention is intended to solve the problems described above and aims to provide a touch panel with excellent mechanical strength.

Means for Solving the Problems

To achieve the aim described above, one aspect of the present invention provided the following steps.

(1) In other words, one aspect of a touch panel according to one aspect of the present invention is a touch panel including an active area where a touch input is performed, including: a tempered glass substrate having a compressive stress layer formed in a surface thereof; a transparent electrode made of an inorganic oxide film formed within the active area of the touch panel over the tempered glass substrate; a base layer made of an organic film provided between the transparent electrode and the compressive stress layer, the base layer being sandwiched between the transparent electrode and the compressive stress layer such that the transparent electrode and the compressive stress layer are not in contact with each other; and an overcoat layer made of an organic film provided on a side of the transparent electrode that is opposite to the compressive stress layer, the overcoat layer covering the transparent electrode so as to contact the transparent electrode on the base layer.

(2) In the touch panel described above in (1), the touch panel according to claim 1, wherein an elastic modulus of the overcoat layer may be greater than an elastic modulus of the base layer.

(3) In the touch panel described above in (2), the touch panel according to claim 2, wherein a ratio G1/G2, where G1 may be the elastic modulus of the base layer and G2 is the elastic modulus of the overcoat layer, is approximately 13/2000.

(4) In the touch panel described above in (3), the touch panel according to claim 3, wherein a ratio t1/t2, where t1 is a thickness of the base layer and t2 may be a thickness of the overcoat layer, is approximately 2/3.

Effects of the Invention

According to one aspect of the present invention, a touch panel with excellent mechanical strength can be provided.

DETAILED DESCRIPTION OF EMBODIMENT

Figure 1:
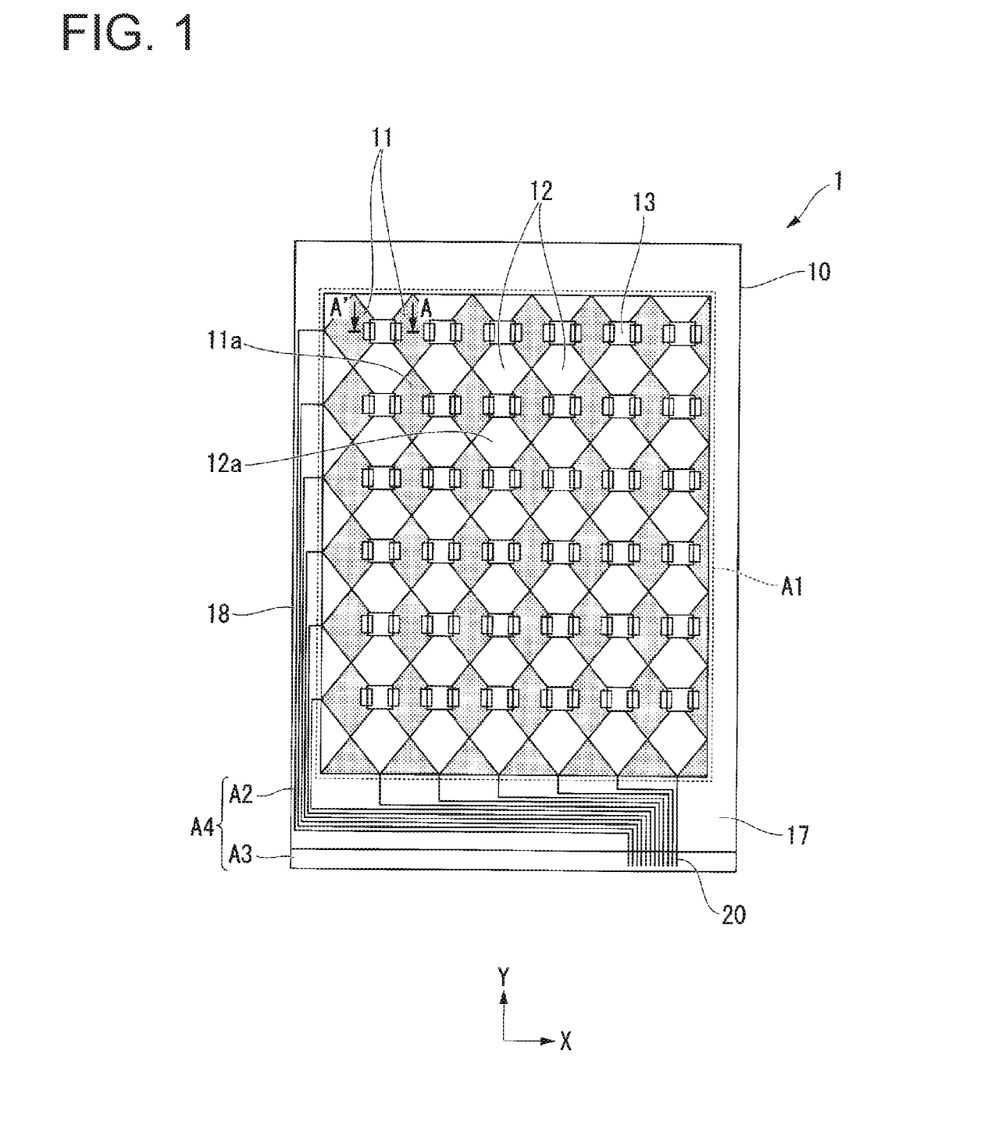
FIG. 1 is a plan view of a touch panel according to an embodiment of the present invention.

FIG. 1 is a plan view of a touch panel 1 according to an embodiment of the present invention.

In the present embodiment, the outer shape of the touch panel 1 is a rectangular shape, and the direction parallel to a side of the touch panel is defined as the X direction, and the direction perpendicular to the side is defined as the Y direction.

The touch panel 1 is a touch panel integrated with a cover glass with a touch sensor formed on a tempered glass substrate 10. A compressive stress layer 10a (see FIG. 2) is formed on the surface of the tempered glass substrate 10 by an ion exchange method, an air cooling strengthening method, or the like. The present embodiment uses a glass substrate in which the compressive stress is generated by chemically substituting the outermost surface of the glass substrate that contains alkali elements with elements with a larger ionic radius than the alkali element, for example. The thickness of the tempered glass substrate 10 is 0.5 mm to 1.1 mm, for example. The tempered glass substrate 10 thus formed has a fracture strength of about three to five times that of an alkali-free glass substrate used in a liquid crystal panel.

A plurality of first electrodes 11 extending in the X direction and a plurality of second electrodes 12 extending in the Y direction are provided on the tempered glass substrate 10. The first electrodes 11 are formed by connecting a plurality of diamond-shaped electrodes 11a in the X direction via respective connecting parts 14 (see FIG. 2). The second electrodes 12 are formed by connecting a plurality of diamond-shaped electrodes 12a in the Y direction via respective connecting parts 13 (see FIG. 2). The first electrodes 11 (the diamond-shaped electrodes 11a, the connecting parts 14) and the second electrodes 12 (the diamond-shaped electrodes 12a, the connecting parts 13) are transparent electrodes made of an inorganic oxide film such as ITO (indium tin oxide).

The capacitive touch sensor is formed by the first electrodes 11 and the second electrodes 12. The touch panel 1 detects the magnitude of parasitic capacitance of each intersection between the first electrodes 11 and the second electrodes 12 on the basis of the distortion of the signal waveform supplied to the first electrodes 11 and the second electrodes 12. On the basis of the change in parasitic capacitance, the touch panel detects the position of an indicating member (a finger or a pen, for example) that performed a touch input.

The center of the tempered glass substrate 10 is provided with an active area A1 where the touch input is performed. The periphery of the active area A1 is provided with a panel peripheral section A4. The panel peripheral section A4 includes: a wiring forming section A2 where a wiring 18 that connects to the first electrodes 11 and the second electrodes 12 is formed; and a terminal section A3 where a terminal 20 connected to the wiring 18 is formed. A flexible wiring substrate (not shown) is connected to the terminal section A3. A rectangular, frame-shaped light-shielding layer 17 is formed on the wiring forming section A2 so as to border the active area A1.

Figure 2:
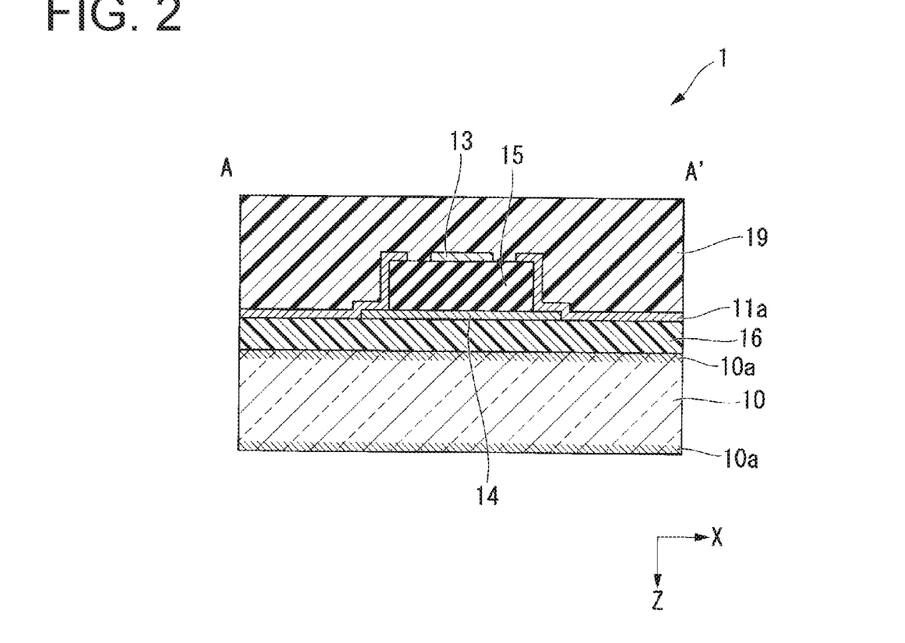
FIG. 2 is a cross-sectional view of the touch panel along the line A-A' in FIG. 1.

FIG. 2 is a cross-sectional view along the line A-A' of FIG. 1.

In other words, FIG. 2 is a cross-sectional view of a part of the active area A1 (see FIG. 1) of the touch panel 1 that includes the first electrode 11 (the diamond-shaped electrode 11a, the connecting part 14).

As shown in FIG. 2, the compressive stress layer 10a is formed on the front surface and the back surface of the tempered glass substrate 10.

A base layer 16 made of an organic film such as a transparent photosensitive resin is formed on one surface of the tempered glass substrate 10 covering the compressive stress layer 10a. The connecting part 14 made of an inorganic oxide film such as ITO is formed on the surface of the base layer 16 at corresponding intersections of the first electrodes 11 and the second electrodes 12 (see FIG. 1). An insulating layer 15 with an area smaller than that of the connecting part 14 viewed from the Z direction is formed on the surface of the connecting part 14.

The diamond-shaped electrodes 11a and the diamond-shaped electrodes 12a (see FIG. 1) are formed on the surface of the base layer 16 so as to cover the portion of the connecting part 14 that is exposed from the insulating layer 15. The diamond-shaped electrodes 11a and the diamond-shaped electrodes 12a are formed such that a portion thereof rides up on the periphery of the insulating layer 15. The connecting part 13 is formed on the surface of the insulating layer 15.

An overcoat layer 19 made of a transparent resin such as acrylic is formed on one surface of the tempered glass substrate 10 covering the base layer 16, the diamond-shaped electrodes 11a and 12a, the connecting part 13, and the insulating layer 15. The overcoat layer 19 is formed covering the diamond-shaped electrodes 11a and 12a and the connecting part 13 so as to touch the diamond-shaped electrodes 11a and 12a and the connecting part 13 on the base layer 16.

In the present embodiment, the elastic modulus G2 of the overcoat layer 19 is greater than the elastic modulus G1 of the base layer 16 (G1<G2).

The elastic modulus is measured using a universal tester manufactured by Instron. To measure the compressive elastic modulus of a resin, first, a block-like test piece having a shape of a rectangular cuboid, a cube, a cylinder, or a hollow cylinder is sandwiched between two parallel plates. Then, a compressive load is applied from both ends of the test piece, and the relationship between the compressive stress and the resulting distortion is measured. The corresponding JIS standard is JISK 7181 (Plastic-Determination of compressive properties).

Here, defining the compressive stress as $\sigma$, the compressive load as F, and the plate (test piece) area as A satisfies the formula $\sigma = F/A$.

Defining the distortion as $\epsilon$, the reduction in length from the initial length as $\Delta L$, and the reference length as L0 satisfies the formula $\epsilon = \Delta L/L0$.

Defining the compressive elastic modulus as E, the compressive stress when $\epsilon = 0.0005$ as $\sigma 2$, and the compressive stress when $\epsilon = 0.0025$ as $\sigma 1$ satisfies the formula $E = (\sigma 2 - \sigma 1)/(\epsilon 2 - \epsilon 1)$.

The base layer 16 is made of polydimethylsiloxane (PDMS)-based material (elastic modulus G1: about 13 Mpa), and the thickness t1 of the base layer 16 is about 2 μm, for example. On the other hand, the overcoat layer 19 is made of acrylic material (elastic modulus G2: about 2 GPa), and the thickness t2 of the overcoat layer 19 is about 3 μm. The insulating layer 15 is made of the same material as the overcoat layer 19.

As shown in FIG. 2, the thickness t2 of the overcoat layer 19 where the connecting part 13 is formed differs from that where the connecting part 13 is not formed. In the present embodiment, the thickness t2 of the overcoat layer 19 refers to the thickness thereof where the connecting part 13 is not formed (the distance between the top surface of the diamond-shaped electrode 11a and the top surface of the overcoat layer 19).

The material and the thickness of the base layer 16 and the overcoat layer 19 are not limited to these, and a various types of material and thicknesses can be used. From the perspective of providing a touch panel having excellent mechanical strength, it is preferable that the ratio of the elastic modulus G1 of the base layer 16 to the elastic modulus G2 of the overcoat layer 19 G1/G2 be approximately 13/2000, and the ratio of the thickness t1 of the base layer 16 to the thickness t2 of the overcoat layer 19 t1/t2 be approximately 2/3.

The base layer 16 may be formed on at least part of the active area A1 where the diamond-shaped electrodes 11a and 12a and the connecting part 14 are formed. However, in the present embodiment, in order to eliminate the trouble of patterning, the base layer 16 is formed on the entire surface of the tempered glass substrate 10. In other words, the base layer 16 is formed on both the active area A1 and the panel peripheral section A4 (see FIG. 1).

In the touch panel 1 according to the configuration described above, the diamond-shaped electrodes 11a and 12a made of an inorganic oxide film are formed on the surface of the base layer 16 made of an organic film. The diamond-shaped electrodes 11a and 12a and the compressive stress layer 10a sandwich the base layer 16 so as not to touch one another. Furthermore, the overcoat layer 19 made of an organic film covers the diamond-shaped electrodes 11a and 12a made of an inorganic oxide film such that the overcoat layer touches the diamond-shaped electrodes. In this configuration, the bend in the diamond-shaped electrodes 11a and 12a caused by the bend in the tempered glass substrate 10 that occurs when there is mechanical impact in the active area A1 can be reduced. The base layer 16 and the overcoat layer 19, which are more flexible than the diamond-shaped electrodes 11a and 12a, serve the role of a cushioning material, which makes it possible to effectively demonstrate the mechanical strength inherent in the tempered glass substrate 10 and to prevent stress from concentrating on the diamond-shaped electrodes 11a and 12a.

Compared to the case in which the elastic modulus G2 of the overcoat layer 19 is less than or equal to the elastic modulus G1 of the base layer 16 (G1≥G2), the concentration of stress on the diamond-shaped electrodes 11a and 12a can be effectively prevented because the elastic modulus G2 of the overcoat layer 19 is greater than the elastic modulus G1 of the base layer 16 (G1<G2).

Also, the concentration of stress on the diamond-shaped electrode 11a and 12a can be effectively prevented because the ratio of the elastic modulus G1 of the base layer 16 to the elastic modulus G2 of the overcoat layer 19 G1/G2 is approximately 13/2000 and because the ratio of the thickness t1 of the base layer 16 to the thickness t2 of the overcoat layer 19 t1/t2 is approximately 2/3.

The effects of the overcoat layer 19 will be described below using FIGS. 3 and 4.

Figure 3:
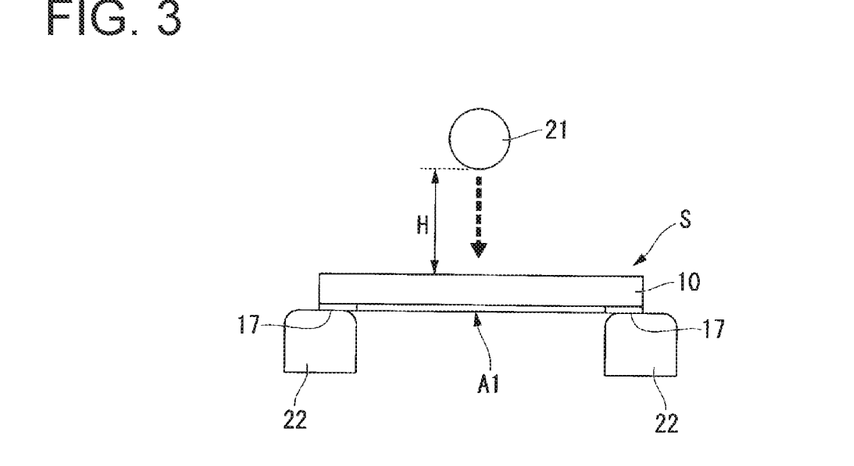
FIG. 3 is a diagram showing a method of an impact test of a touch panel.

FIG. 3 is a diagram showing the method of an impact test of the touch panel S. FIG. 4 is a diagram showing the result of the impact test of the touch panel S.

As shown in FIG. 3, the impact test of the touch panel S was conducted by dropping a weight 21 with a prescribed weight from the back surface side of the touch panel S (the side on which the touch sensor is not formed) on top of the active area A1 under a condition in which the periphery of the touch panel S is supported by support bases 22. The weight of the weight 21 is 130 g in the present embodiment. The height H from the touch panel S to the weight 21 can be changed between 0 mm to 800 mm. The load resistance property of the touch panel S is measured with the fracture height set as the height H of the weight 21 when a crack occurs on the tempered glass substrate 10 or when the diamond-shaped electrodes 11a and 12a become disconnected.

Figure 4:
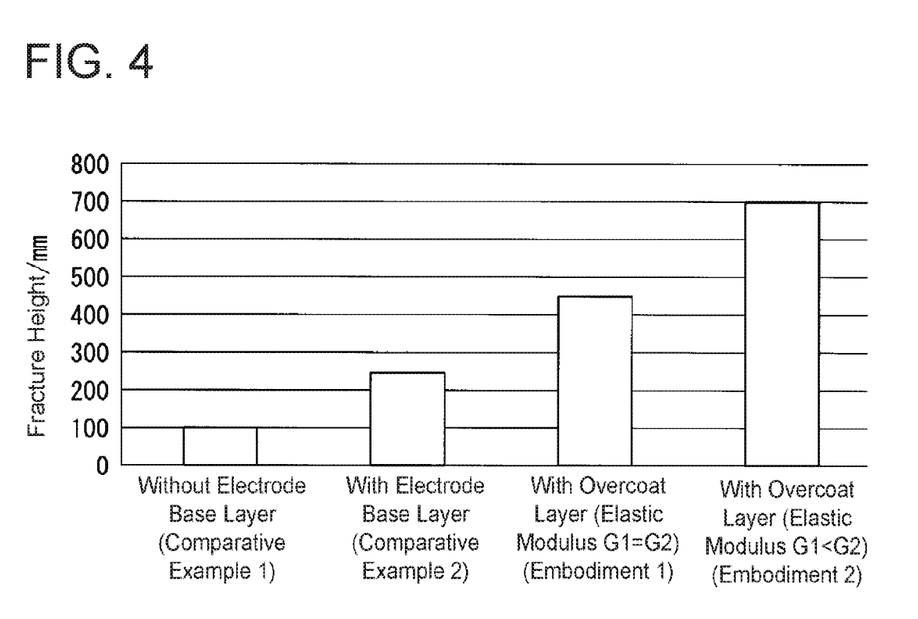
FIG. 4 is a diagram showing the result of the impact test of the touch panel.
Figure 7:
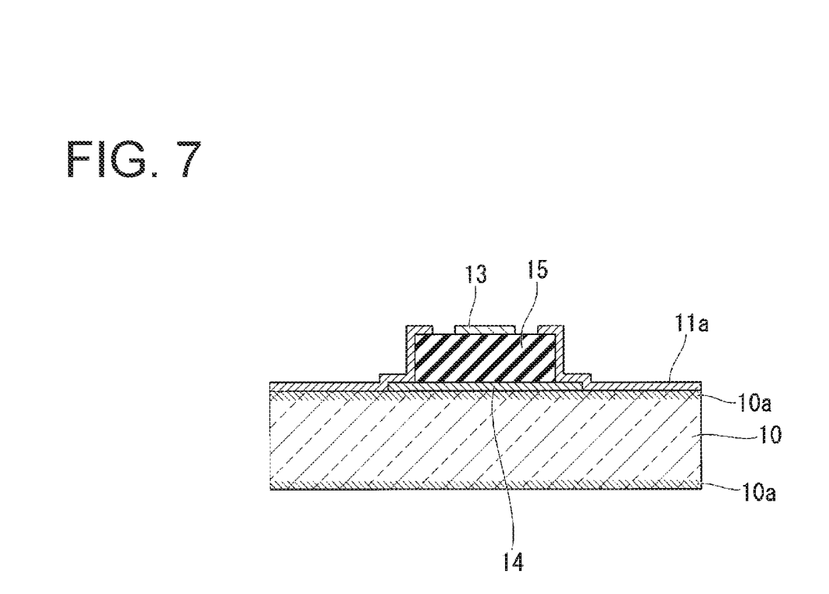
FIG. 7 is a cross-sectional view of a touch panel of Comparative Example 1.

In FIG. 4, "without electrode base layer" refers to a case in which the base layer made of an organic film is not formed between the compressive stress layer of the tempered glass substrate 10 and the diamond-shaped electrodes (Comparative Example 1, see FIG. 7). "With electrode base layer" refers to a case in which the base layer made of an organic film is formed between the compressive stress layer of the tempered glass substrate 10 and the diamond-shaped electrodes (Comparative Example 2, see FIG. 8). "With overcoat layer (G1=G2)" refers to a case in which the overcoat layer made of an organic film having the same elastic modulus as the base layer is formed on the side of the diamond-shaped electrodes opposite to the compressive stress layer (Working Example 1, see FIG. 2). "With overcoat layer (G1<G2)" refers to a case in which the overcoat layer made of an organic film having an elastic modulus that is greater than that of the base layer is formed on the side of the diamond-shaped electrodes opposite to the compressive stress layer (Working Example 2, see FIG. 2).

The thickness of the tempered glass substrate 10 is 0.7 mm in Comparative Example 1, Comparative Example 2, Working Example 1, and Working Example 2. The insulating layer 15 is formed by an acrylic resin (elastic modulus G2: 2 GPa).

Figure 8:
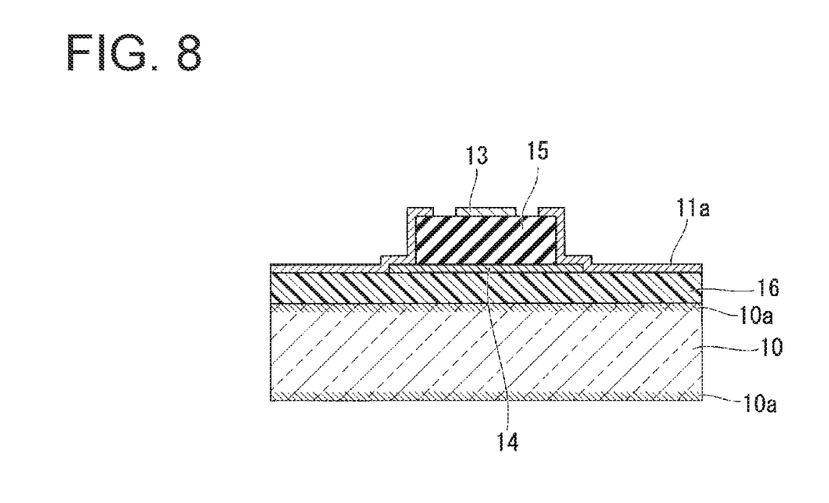
FIG. 8 is a cross-sectional view of a touch panel of Comparative Example 2.

In Comparative Example 2, the base layer 16 is formed by polydimethylsiloxane (elastic modulus G1: 13 MPa), and the thickness t1 of the base layer 16 is 2 μm.

In Working Example 1, the base layer 16 is formed by an acrylic resin (elastic modulus G2: 2 GPa), and the thickness t1 of the base layer 16 is 2 μm. The overcoat layer 19 is also formed by an acrylic resin (the elastic modulus G2: 2 GPa), and the thickness t2 of the overcoat layer 19 is about 3 μm.

In Working Example 2, the base layer 16 is formed by polydimethylsiloxane (elastic modulus G1: 13 MPa), and the thickness t1 of the base layer 16 is 2 μm. The overcoat layer 19 is formed by an acrylic resin (the elastic modulus G2: 2 GPa), and the thickness t2 of the overcoat layer 19 is 3 μm.

A plurality of samples (15 cells) with the same configuration were prepared for Comparative Example 1, Comparative Example 2, Working Example 1, and Working Example 2, respectively, and the same test was conducted for each of the samples. FIG. 4 shows the mean values of the measurement of the respective samples from Comparative Example 1, Comparative Example 2, Working Example 1, and Working Example 2.

In the touch panel in which a touch sensor was formed without the base layer on the surface of the tempered glass substrate (Comparative Example 1), the tempered glass substrate cracked, although the diamond-shaped electrodes did not become disconnected, and the fracture height H thereof was determined to be 100 mm.

In the touch panel in which a touch sensor was formed with the base layer on the surface of the tempered glass substrate (Comparative Example 2), the diamond-shaped electrodes became disconnected, although the tempered glass substrate did not crack, and the fracture height H thereof was determined to be 250 mm.

In the touch panel in which the overcoat layer made of an organic film having the same elastic modulus as the base layer was formed on the side of the diamond-shaped electrodes opposite to the compressive stress layer (Working Example 1), the tempered glass substrate did not crack, although the diamond-shaped electrode became disconnected, and the fracture height H thereof was determined to be 450 mm. It was verified that the load resistance property of the touch panel improves in Working Example 1 more than Comparative Example 2.

In the touch panel in which the overcoat layer made of an organic film having the elastic modulus that is greater than that of the base layer was formed on the side of the diamond-shaped electrodes opposite to the compressive stress layer (Working Example 2), the tempered glass substrate did not crack, although the diamond-shaped electrode became disconnected, and the fracture height H thereof was determined to be 700 mm. It was verified that the load resistance property of the touch panel improves in Working Example 2 more than Working Example 1.

Figure 5:
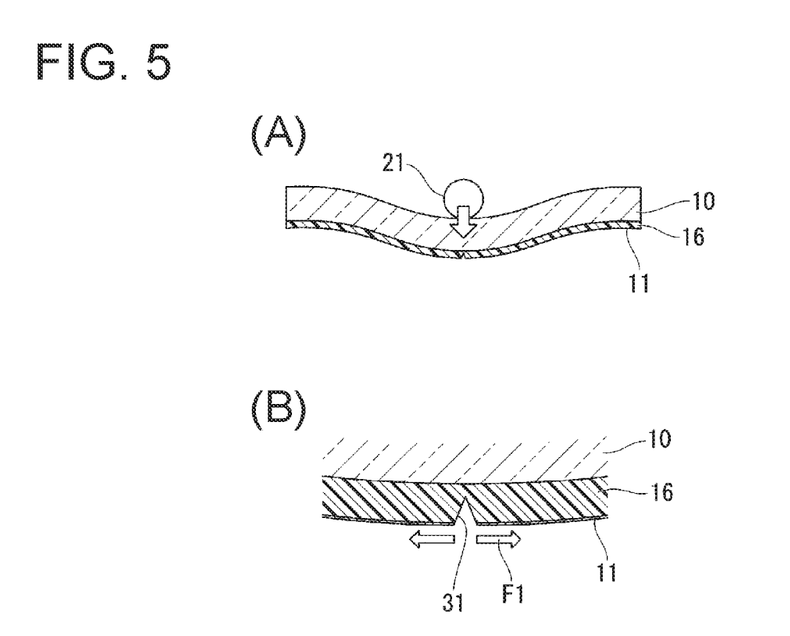
FIG. 5A is a first diagram showing a mechanism, considered based on the results of the impact test in FIG. 4, by which a diamond-shaped electrode according to Comparative Example 2 becomes disconnected.
FIG. 5B is a second diagram showing a mechanism, considered based on the results of the impact test in FIG. 4, by which the diamond-shaped electrode according to Comparative Example 2 becomes disconnected.
Figure 6:
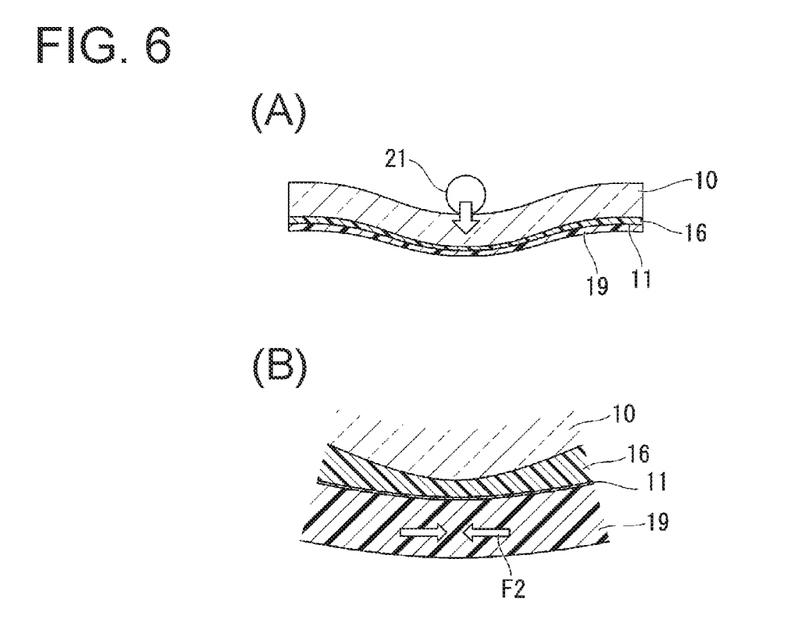
FIG. 6A is a first diagram showing a mechanism, considered based on the results of the impact test in FIG. 4, by which a diamond-shaped electrode according to Working Example 2 becomes disconnected.
FIG. 6B is a second diagram showing a mechanism, considered based on the results of the impact test in FIG. 4, by which the diamond-shaped electrode according to Working Example 2 becomes disconnected.

FIGS. 5A, 5B, 6A, and 6B are diagrams showing mechanisms, considered from the result of the impact test in FIG. 4, by which the diamond-shaped electrode becomes disconnected. FIGS. 5A and 5B show a mechanism by which the diamond-shaped electrode becomes disconnected when the touch sensor is formed with the base layer on the surface of the tempered glass substrate (Comparative Example 2). FIGS. 6A and 6B show a mechanism by which the diamond-shaped electrode becomes disconnected when the overcoat layer made of an organic film having an elastic modulus that is greater than that of the base layer is formed on the side of the diamond-shaped electrodes opposite to the compressive stress layer (Working Example 2). FIGS. 5B and 6B are enlarged views of parts of FIGS. 5A and 6A, respectively.

In Comparative Example 2, when the weight 21 collides with the tempered glass substrate 10 as shown in FIG. 5A, the tensile stress F1 is generated on the transparent electrode 11 (connecting part 14 or diamond-shaped electrode 11a, for example) on the surface of the tempered glass substrate 10 due to the bend in the tempered glass substrate 10 as shown in FIG. 5B. The transparent electrode 11 is extremely thin with a thickness of 0.03 µm to 0.05 µm and has high rigidity because the transparent electrode is made of an inorganic material. Thus, when a significant tensile stress F1 is applied instantaneously due to the collision of the weight 21, a crack 31 is more likely to occur on the transparent electrode 11.

In contrast, in Working Example 2, when the weight 21 collides with the tempered glass substrate 10, the tempered glass substrate 10 is bent as shown in FIG. 6A. However, as shown in FIG. 6B, the compressive stress F2 is generated in the overcoat layer 19, thereby reducing the bend in the transparent electrode 11. This is because the base layer 16 with small elastic modulus reduces the bend in the tempered glass substrate 10 and because the overcoat layer 19 with large elastic modulus holds down the transparent electrode 11 so as to not allow the transparent electrode 11 to become disconnected. Because of these properties, the crack 31 becomes less likely to occur in the transparent electrode 11 even when the significant tensile stress F1 is applied thereto instantaneously due to the collision of the weight 21.

The validity of the mechanism described above is supported by the results of the impact test in FIG. 4. The inventors of the present invention arrived at the present invention based on such findings and verified the remarkably excellent effects of the invention experimentally. According to the present invention, mechanical strength that can withstand practical use can be easily achieved with a simple configuration by merely the provision of a base layer and an overcoat layer.

As described above, in the touch panel 1 of the present embodiment, the base layer 16 made of an organic film is formed between the transparent electrodes 11a, 12a, and 14 and the compressive stress layer 10a, the transparent electrodes 11a, 12a, and 14 and the compressive stress layer 10 sandwich the base layer 16 and do not touch one another, the overcoat layer 19 made of an organic film is formed on the side of the transparent electrode 11a opposite to the compressive stress layer 10, and the overcoat layer 19 is formed covering the transparent electrodes 11a and 12a such that the overcoat layer touches the transparent electrodes 11a and 12a on the base layer 16. Thus, the touch panel 1 that is thin, light and that has excellent mechanical strength can be provided.

Above, a preferable embodiment example according to the present invention was described by referring to the attached figures. However, it goes without saying that the example does not limit the present invention. The shape, the combination, or the like of the respective constituent elements of the touch panel shown in the example described above are one example and can be modified in accordance with design requirements or the like within a scope that does not depart from the gist of the present invention.

INDUSTRIAL APPLICABILITY

One aspect of the present invention can be used in touch panels.

DESCRIPTION OF REFERENCE CHARACTERS 1 touch panel
10 tempered glass substrate
11 first electrode (transparent electrode)
11a diamond-shaped electrode (transparent electrode)
12 second electrode (transparent electrode)
12a diamond-shaped electrode (transparent electrode)
13 connecting part (transparent electrode)
14 connecting part (transparent electrode)
16 base layer
19 overcoat layer
A1 active area

What is claimed is:
1. A touch panel including an active area where a touch input is performed, comprising:
  a tempered glass substrate having a compressive stress layer formed in a surface thereof;
  a transparent electrode made of an inorganic oxide film formed within the active area of the touch panel over the tempered glass substrate;
  a base layer made of an organic film provided between the transparent electrode and the compressive stress layer, said base layer being sandwiched between the transparent electrode and the compressive stress layer such that the transparent electrode and the compressive stress layer are not in contact with each other; and
  an overcoat layer made of an organic film provided on a side of the transparent electrode that is opposite to the compressive stress layer, said overcoat layer covering the transparent electrode so as to contact the transparent electrode on the base layer,
  wherein an elastic modulus of the overcoat layer is greater than an elastic modulus of the base layer.

2. The touch panel according to claim 1, wherein a ratio G1/G2, where G1 is the elastic modulus of the base layer and G2 is the elastic modulus of the overcoat layer, is approximately 13/2000.

3. The touch panel according to claim 2, wherein a ratio $t1/t2$, where $t1$ is a thickness of the base layer and $t2$ is a thickness of the overcoat layer, is approximately 2/3.

* * * * *